(12) United States Patent
Yamahira (10) Patent No.: US 7,808,303 B2
(45) Date of Patent: Oct. 5, 2010

(54) BOOSTER CIRCUIT

(75) Inventor: Seiji Yamahira, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/391,928

(22) Filed: Feb. 24, 2009

(65) Prior Publication Data
US 2009/0295464 A1 Dec. 3, 2009

(30) Foreign Application Priority Data
May 29, 2008 (JP) .............................. 2008-140908

(51) Int. Cl.
 *G05F 1/10* (2006.01)
 *G05F 3/02* (2006.01)
(52) U.S. Cl. ...................... 327/536; 327/534
(58) Field of Classification Search .......... 327/534–536
See application file for complete search history.

(56) References Cited

U.S. PATENT DOCUMENTS

| 6,130,572 | A | 10/2000 | Ghilardelli et al. | |
| 6,501,325 | B1 * | 12/2002 | Meng | 327/536 |
| 6,734,717 | B2 * | 5/2004 | Min | 327/536 |
| 6,952,129 | B2 * | 10/2005 | Lin et al. | 327/536 |
| 2002/0130703 | A1 * | 9/2002 | Tsai | 327/536 |
| 2005/0156923 | A1 | 7/2005 | Nishimura | |
| 2008/0169864 | A1 | 7/2008 | Yamahira | |

FOREIGN PATENT DOCUMENTS

JP  2002-237192 A  8/2002

\* cited by examiner

*Primary Examiner*—Quan Tra
(74) *Attorney, Agent, or Firm*—McDermott Will & Emery LLP (57) ABSTRACT

Analog comparison circuits are provided, each of which compares the potentials of the same stage of a first boosting cell row and a second boosting cell row and selecting and outputting the lower potential. The P-well potentials of switching devices having a triple-well structure are controlled using the output potentials of these analog comparison circuits. As a result, the amplitude of the P-well potential can be suppressed and a common P-well region can be arranged.

14 Claims, 10 Drawing Sheets

BOOSTER CIRCUIT

BACKGROUND OF THE INVENTION

1. Field of the Invention

The present invention relates to a negative booster circuit employing a switching element having a triple-well structure.

2. Description of the Related Art

In recent years, flash memories, which are a type of nonvolatile semiconductor memory devices, require data read and data write using a single power supply voltage or low power supply voltages, for which, therefore, a booster circuit for supplying a positive or negative boosted voltage is required on a chip when each operation is performed. Also, during CMOS processes, a power supply voltage generated by the booster circuit is used to improve characteristics of an analog circuit.

Conventionally, there is a known negative booster circuit employing a triple-well structure switching element (Japanese Unexamined Patent Application Publication No. 2002-237192).

Figure 10:
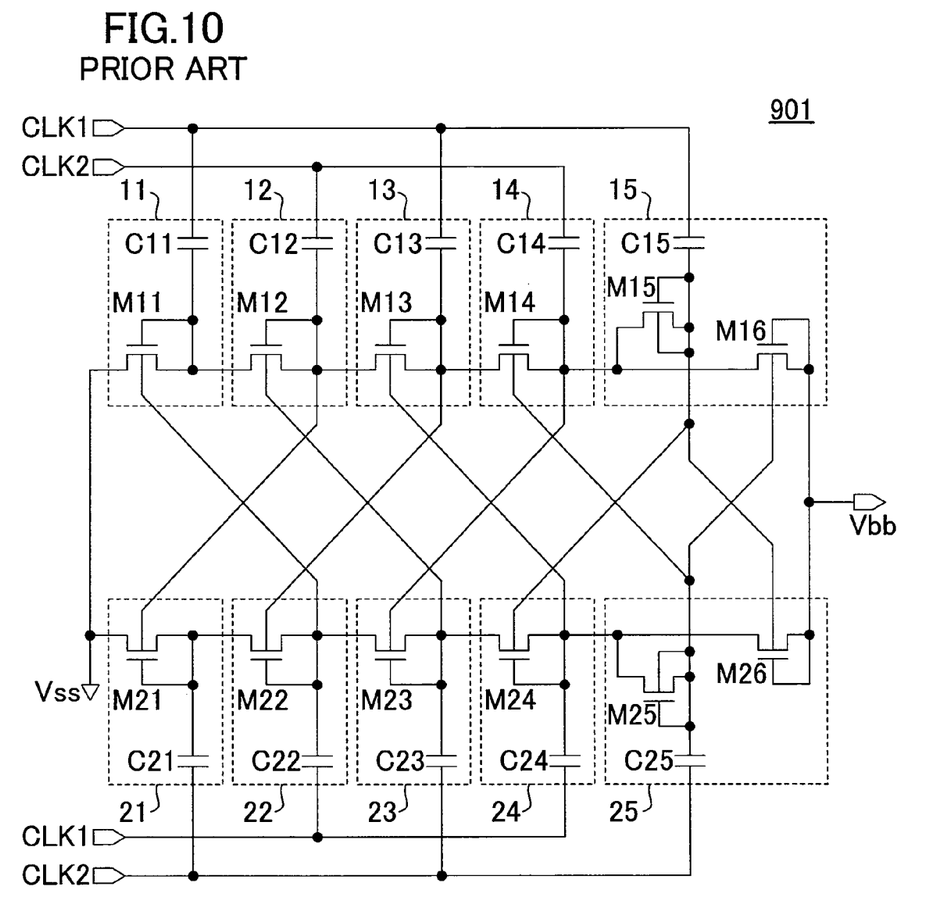
FIG. 10 is a circuit diagram showing an exemplary conventional negative booster circuit.

FIG. 10 shows an exemplary conventional negative booster circuit. In FIG. 10, reference symbol 901 indicates a negative booster circuit that receives two-phase clock signals CLK1 and CLK2 and performs a boosting operation to generate an output terminal voltage (negative boosted voltage) Vbb. The negative booster circuit 901 includes a first row of boosting cells 11, 12, 13 and 14 and a second row of boosting cells 21, 22, 23 and 24, where each row includes four stages. CLK1 is input to boosting cells in the odd-numbered stages of the first row and boosting cells in the even-numbered stages of the second row, while CLK2 is input to boosting cells in the even-numbered stages of the first row and boosting cells in the odd-numbered stages of the second row. Reference symbols 15 and 25 indicate backflow preventing circuits for preventing a backflow of the boosted voltage Vbb. Reference symbols M11 to M14 and M21 to M24 indicate charge transfer transistors (N-channel transistors) whose P-wells are connected to the output terminals of boosting cells in the respective next stages for a substrate control and which function as switching devices. Further, reference symbols M15 to M16 and M25 to M26 indicate N-channel transistors in the backflow preventing circuits 15 and 25, and reference symbols C11 to C15 and C21 to C25 indicate booster capacitances.

An operation of the negative booster circuit 901 of FIG. 10 will be briefly described with reference to FIG. 11. For example, attention is paid to the boosting cells 12 and 22 in the second stage.

The two-phase clock signals CLK1 and CLK2 in the negative booster circuit 901 are clocks whose phases are different from each other by 180 degrees.

Initially, at time T1, CLK1 goes to "H" (power supply voltage Vdd) and CLK2 goes to "L" (ground voltage Vss), so that the charge transfer transistor M12 of the boosting cell 12 goes to the non-conductive state, and the output terminal voltage decreases or is negatively boosted. In this case, at the same time, the P-well voltage of the charge transfer transistor M12 also decreases, so that the input/output terminal voltage and the P-well voltage of the charge transfer transistor M12 can be maintained in the reverse-bias state. On the other hand, the output voltage of the boosting cell 22 increases, so that the charge transfer transistor M22 goes to the conductive state, and therefore, charges are transferred from the output terminal to the input terminal of the boosting cell 22. In this case, the input/output terminal voltage and the P-well voltage of the charge transfer transistor M22 simultaneously increase while being maintained in the reverse-bias state, so that charge transfer can be performed while suppressing the substrate bias effect of the charge transfer transistor M22.

Next, at time T2, CLK1 goes to "L" (ground voltage Vss) and CLK2 goes to "H" (power supply voltage Vdd), so that the operations of the boosting cells 12 and 22 can be switched. At time T3, the state goes back to that of time T1, in which a negative boosting operation is repeated.

As described above, according to the negative booster circuit 901 of FIG. 10, the input/output terminal voltage and the P-well voltage of a boosting cell can be controlled while being invariably maintained in the reverse-bias state, so that even when a charge transfer transistor including the input/output terminal (N-diffusion), the P-well and the N-well (triple wells) of a boosting cell is employed, it is possible to prevent a reduction in boosting efficiency due to a parasitic bipolar transistor, thereby further suppressing the substrate bias effect of the charge transfer transistor, so that the charge transfer efficiency during a boosting operation can be improved.

However, in the conventional negative booster circuit 901, for example, the P-well of the charge transfer transistor M12 of the boosting cell 12 is connected to the output terminal of the boosting cell 23. Therefore, a parasitic capacitance formed by the P-well of the charge transfer transistor M12 is charged and discharged by voltage transition widths of the clock signals CLK1 and CLK2 in response to the voltage transitions of the clock signals CLK1 and CLK2. As a result, current consumption disadvantageously increases.

Also, charges supplied by the clock signals CLK1 and CLK2 are used as charges for charging and discharging the P-well of the charge transfer transistor M12. As a result, the boosting efficiency decreases.

Also, since the P-well of the charge transfer transistor M12 is connected to the output terminal of the boosting cell 23, the P-well of the charge transfer transistor M12 needs to be separated from the other charge transfer transistors. As a result, the layout area disadvantageously increases.

SUMMARY OF THE INVENTION

An object of the present invention is to provide a negative booster circuit in which the substrate bias effect of a switching device employed in each boosting cell is suppressed, and the current consumption and the layout area can also be suppressed.

To achieve the object, in the negative booster circuit of the present invention, the potential of the P-well of each boosting cell is fixed to the output potential of the boosting cell stage, thereby reducing the amount of charges charged and discharged between the P-well and the N-well, so that the boosting efficiency can be improved.

Specifically, according to an aspect, a booster circuit includes boosting cells each having a first-conductivity type first well region on a substrate, a second-conductivity type second well region in the first well region, and at least one first switching element in either or both of the first well region and the second well region, a first boosting cell row including N stages ($N \geq 1$) of the boosting cells, a second boosting cell row including M stages ($M \geq 1$) of the boosting cells, and a first analog comparison circuit for comparing an output potential of the boosting cell in the i-th stage ($1 \leq i \leq N$) of the first boosting cell row and an output potential of the boosting cell in the i-th stage ($1 \leq i \leq M$) of the second boosting cell row. An output potential of the first analog comparison circuit is applied to the second well region of the at least one first switching element included in at least one of the boosting cells in a k-th stage ($1 \leq k \leq i$).

According to another aspect, a booster circuit includes boosting cells each having a first-conductivity type first well region on a substrate, a second-conductivity type second well region in the first well region, and at least one first switching element in either or both of the first well region and the second well region, a first boosting cell row including N stages (N≧1) of the boosting cells, and a second boosting cell row including M stages (M≧1) of the boosting cells. The second well region of the boosting cell in the i-th stage (1≦i≦N) of the first boosting cell row and the second well region of the boosting cell in the i-th stage (1≦i≦M) of the second boosting cell row are a common well region shared by the boosting cell in the i-th stage (1≦i≦N) of the first boosting cell row and the boosting cell in the i-th stage (1≦i≦M) of the second boosting cell row.

According to the present invention, the potential of the second well region of each boosting cell can be fixed to the output potential of the boosting cell stage, thereby preventing a reduction in boosting efficiency due to a parasitic bipolar transistor and suppressing the substrate bias effect of a charge transfer transistor, so that the amount of charges charged and discharged between the P-well and the N-well can be reduced, and therefore, the current consumption can be reduced. Also, since the amount of charges charged and discharged between the P-well and the N-well is reduced, the amount of charges transferred from the next stage to the previous stage can be increased, so that the boosting efficiency can be improved. Also, a common second well region can be arranged, so that the layout area can be reduced.

DETAILED DESCRIPTION OF THE PREFERRED EMBODIMENTS

Hereinafter, a negative booster circuit according to an embodiment of the present invention will be described with reference to the accompanying drawings.

Figure 1:
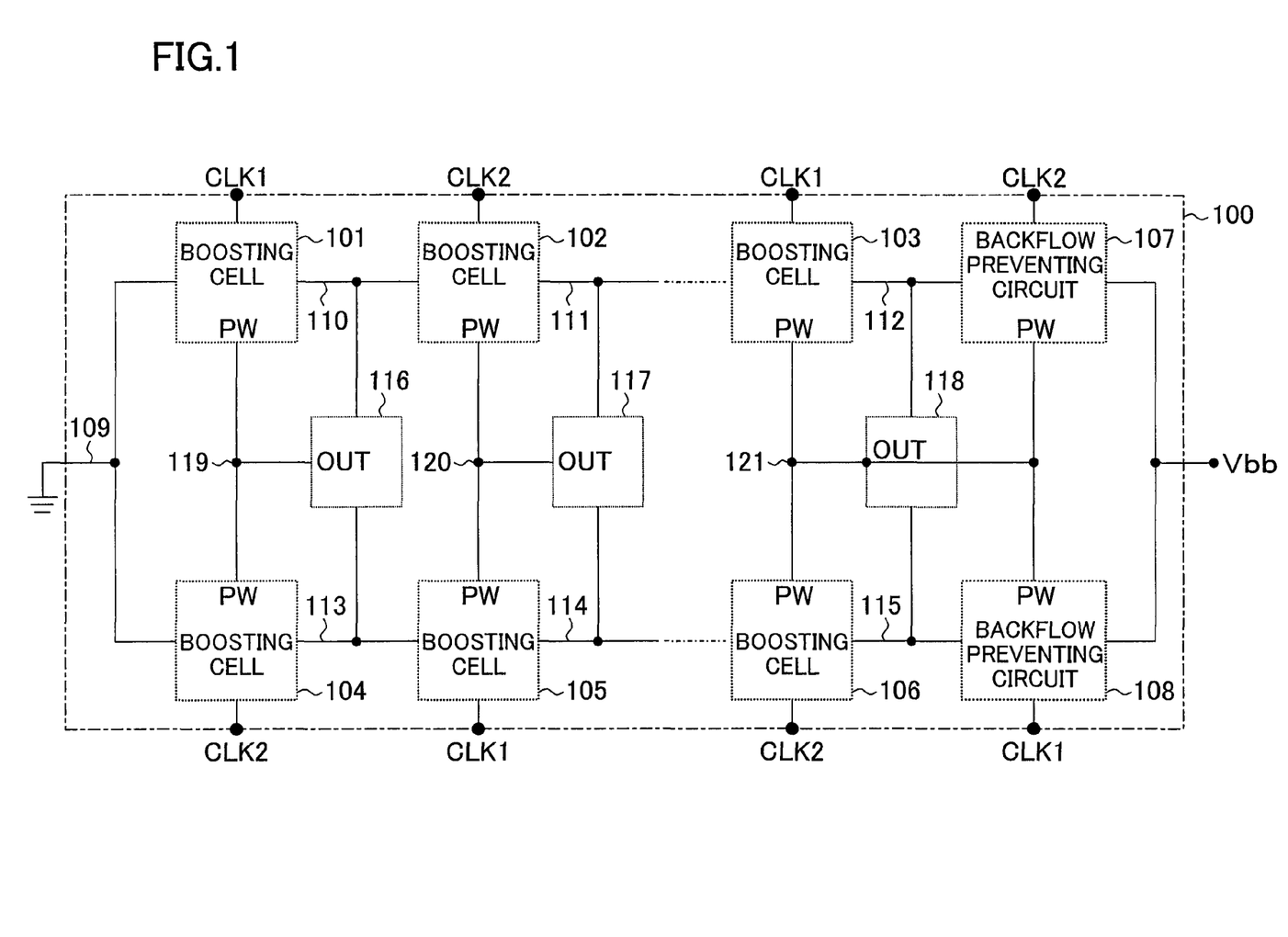
FIG. 1 is a block diagram showing an exemplary configuration of a negative booster circuit according to the present invention.

FIG. 1 shows an exemplary configuration of the negative booster circuit of the present invention. In FIG. 1, reference symbol 100 indicates a negative booster circuit having two parallel rows of boosting cells that receives two-phase clock signals CLK1 and CLK2 to perform a negative boosting operation, thereby generating an output terminal voltage (negative boosted voltage) Vbb. Reference symbols 101, 102, 103, 104, 105 and 106 indicate a first row and a second row of boosting cells, where CLK1 is input to boosting cells in the odd-numbered stages of the first row and CLK2 is input to boosting cells in the even-numbered stages of the first row, while CLK2 is input to boosting cells in the odd-numbered stages of the second row and CLK1 is input to boosting cells in the even-numbered stages of the second row. Reference symbols 107 and 108 indicate backflow preventing circuits for preventing a backflow of the negative boosted voltage Vbb. Reference symbols 109, 110, 111, 112, 113, 114 and 115 indicate input/output terminals of the boosting cells 101 to 106, respectively. Reference symbols 116, 117 and 118 indicate exemplary analog comparison circuits each of which outputs the lower one (having the larger absolute value) of the voltages of the input/output terminals of the boosting cells in the same corresponding stage of the first and second rows. Reference symbols 119, 120 and 121 indicate output terminals of the analog comparison circuits 116, 117 and 118, respectively, connected to the P-wells (PWs) of the respective boosting cells or backflow preventing circuits.

Figure 2A:
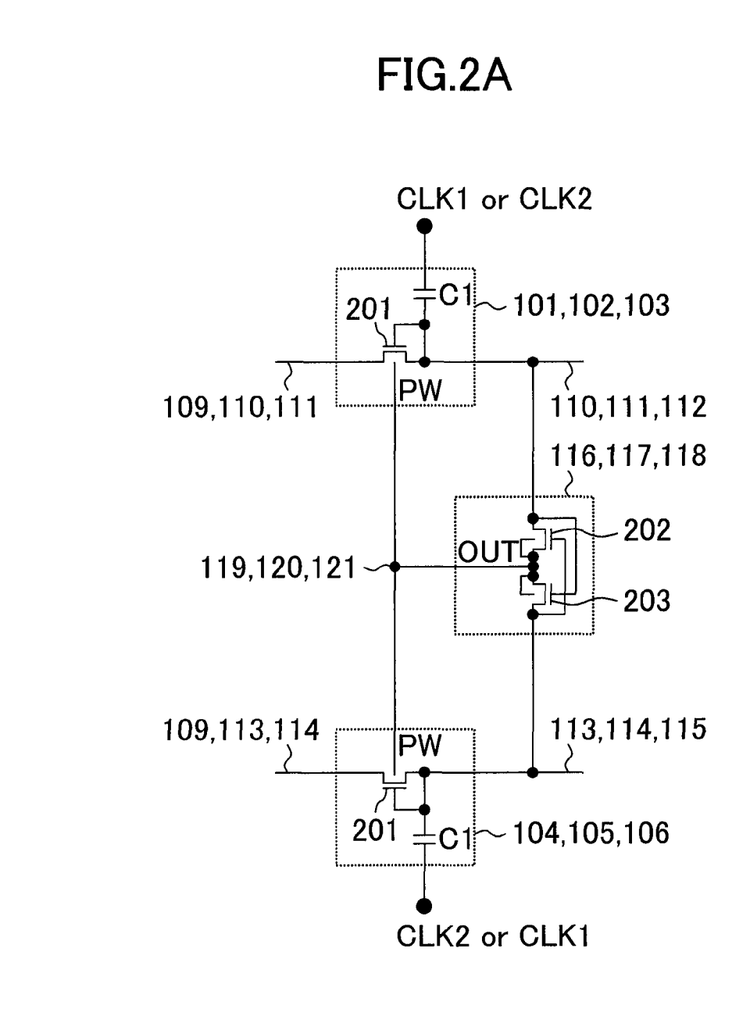
FIGS. 2A and 2B are circuit diagrams showing a detailed exemplary configuration of the negative booster circuit of the present invention.

FIG. 2A shows an exemplary specific configuration of the boosting cell 101, 102, 103, 104, 105, 106 and the analog comparison circuit 116, 117, 118. Reference symbol 201 indicates an Nch (N-channel) charge transfer transistor having a triple-well structure that transfers charges from the input/output terminal (output terminal) 110, 111, 112 (113, 114, 115) to the input/output terminal (input terminal) 109, 110, 111 (109, 113, 114) of the boosting cell. Reference symbol C1 indicates a booster capacitance for pumping the input/output terminal 110, 111, 112 (113, 114, 115). Reference symbols 202 and 203 indicate Nch transistors used in the analog comparison circuit 116, 117, 118.

Figure 2B:
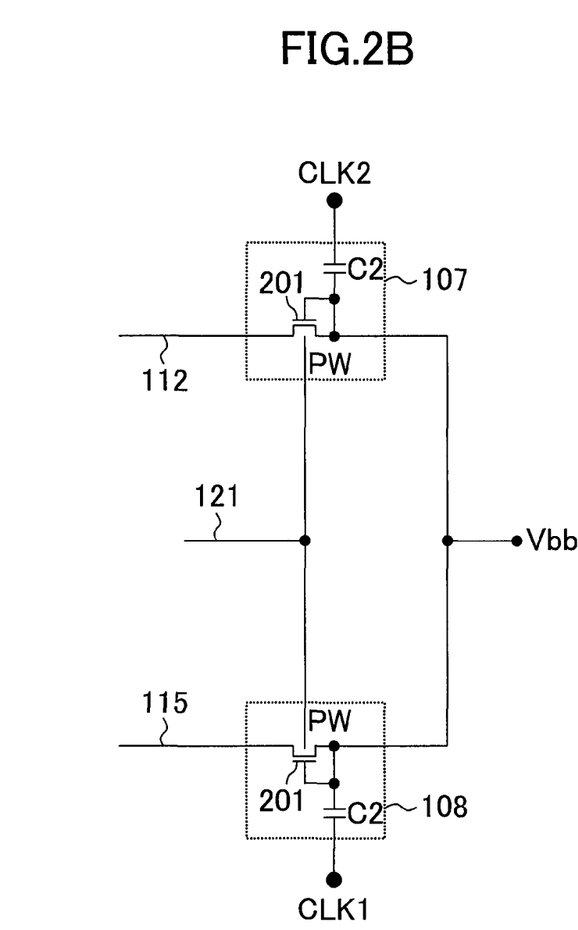

FIG. 2B shows an exemplary specific configuration of the backflow preventing circuit 107, 108, which includes a charge transfer transistor 201 that is an Nch transistor having a triple-well structure that transfers charges from the output terminal of the negative booster circuit 100 to the input/output terminal (input terminal) 112 (115), and a booster capacitance C2.

Figure 11:
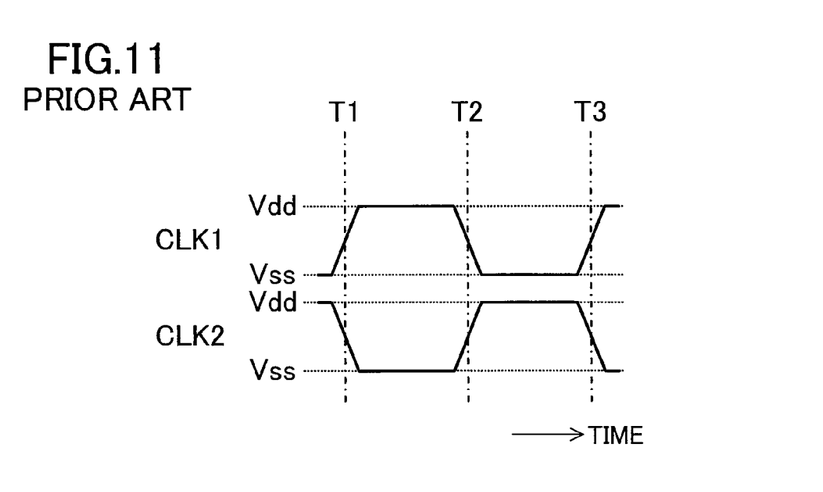
FIG. 11 is a waveform diagram showing two-phase clock signals in the negative booster circuit of FIG. 10.

The two-phase clock signals CLK1 and CLK2 in the negative booster circuit 100 of FIG. 1 have waveforms similar to those of FIG. 11. An operation of the negative booster circuit 100 of FIG. 1 will be described with reference to FIG. 11.

At time T1, if CLK1 goes from "L" to "H" and CLK2 goes from "H" to "L", the potentials of the input/output terminals 111, 113 and 115 of the boosting cells 102, 104 and 106 are negatively boosted (decreased), so that charges are transferred from the input/output terminal 112 to the input/output terminal 111, from the input/output terminal 114 to the input/output terminal 113, and from the output terminal of the negative booster circuit 100 to the input/output terminal 115, via the charge transfer transistors 201 of the boosting cells 103 and 105 and the backflow preventing circuit 108, respectively. In this case, in the analog comparison circuit 116, the Nch transistor 202 goes to the OFF state and the Nch transistor 203 goes to the ON state due to a potential relationship between the input/output terminal 113 negatively boosted and the input/output terminal 110 not negatively boosted, so that the potential of the input/output terminal 113 is output to the output terminal 119 of the analog comparison circuit 116, and is then supplied to the P-wells of the boosting cells 101 and 104. Similarly, the potential of the input/output terminal 111 is output to the output terminal 120 of the analog comparison circuit 117, and is then supplied to the P-wells of the boosting cells 102 and 105. The potential of the input/output terminal 115 is output to the output terminal 121 of the analog comparison circuit 118, and is then supplied to the P-wells of the boosting cells 103 and 106 and the P-wells of the backflow preventing circuits 107 and 108.

At time T2, if CLK1 goes from "H" to "L" and CLK2 goes from "L" to "H", the potentials of the input/output terminals 110, 112 and 114 of the boosting cells 101, 103 and 105 are negatively boosted, so that charges are transferred from the input/output terminal 111 to the input/output terminal 110, from the input/output terminal 115 to the input/output terminal 114, from the output terminal of the negative booster circuit 100 to the input/output terminal 112, via the charge transfer transistors 201 of the boosting cells 102 and 106 and the backflow preventing circuit 107, respectively. In this case, in the analog comparison circuit 116, the Nch transistor 202 goes to the ON state and the Nch transistor 203 goes to the OFF state due to a potential relationship between the input/output terminal 110 negatively boosted and the input/output terminal 113 not negatively boosted, so that the potential of the input/output terminal 110 is output to the output terminal 119 of the analog comparison circuit 116, and is then supplied to the P-wells of the boosting cells 101 and 104. Similarly, the potential of the input/output terminal 114 is output to the output terminal 120 of the analog comparison circuit 117, and is then supplied to the P-wells of the boosting cells 102 and 105. The potential of the input/output terminal 112 is output to the output terminal 121 of the analog comparison circuit 118, and is then supplied to the P-wells of the boosting cells 103 and 106 and the P-wells of the backflow preventing circuits 107 and 108.

Thus, according to the negative booster circuit 100 of FIG. 1, the potential of the P-well of each of the boosting cells 101 to 106 and the backflow preventing circuits 107 and 108 can be fixed to the output potential of the corresponding boosting cell stage. Therefore, a reduction in boosting efficiency due to the parasitic bipolar transistor can be substantially prevented, and in addition, the amount of charges charged and discharged between the P-well and the N-well can be reduced, so that the current consumption can be reduced. Also, the reduction of the amount of charges charged and discharged between the P-well and the N-well can lead to an increase in the amount of charges transferred to the next stage, so that the boosting efficiency can be improved and the boosting clock can be sped up, and therefore, a reduction in layout area can be expected.

Note that the analog comparison circuits 116 to 118 can be provided to any number of boosting cell stages, taking into consideration the margin of the breakdown voltage between the P-well and the N-well and the circuit area. Thus, an effect similar to that of the aforementioned configuration can be obtained, while the number of elements is reduced. Also, if a diode means is provided between the input terminal or the output terminal and the P-well of a boosting cell in a stage that does not include an analog comparison circuit, a forward bias between the P-well and the input/output terminal of the boosting cell can be avoided during activation of the negative booster circuit, so that it can be expected that the operation of the negative booster circuit is caused to be stable. Also, by supplying, to the P-well of a boosting cell in another negative booster circuit that does not include an analog comparison circuit, the output voltage of an analog comparison circuit in the corresponding stage, an increase in area of the negative booster circuit can be substantially prevented.

Figure 3:
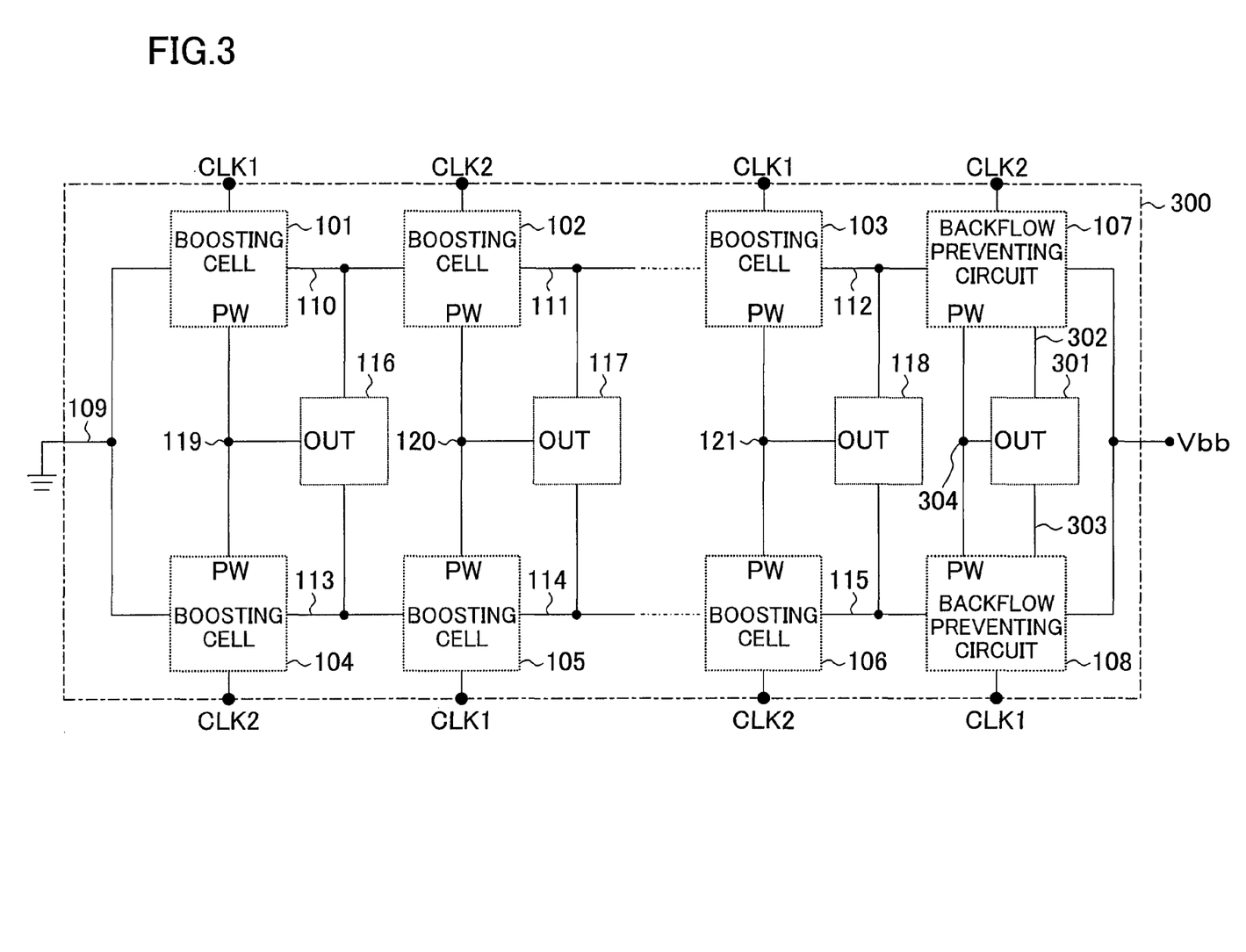
FIG. 3 is a block diagram showing another exemplary configuration of the negative booster circuit of the present invention.

FIG. 3 shows still another exemplary configuration of the negative booster circuit of the present invention. In FIG. 3, reference symbol 300 indicates a negative booster circuit including two parallel rows of boosting cells that receives two-phase clock signals CLK1 and CLK2 to perform a boosting operation, thereby generating a negative boosted voltage Vbb. Reference symbol 301 indicates an analog comparison circuit that compares the voltages of intermediate terminals 302 and 303 of the backflow preventing circuits 107 and 108 of FIG. 1 to output the lower voltage (having the larger absolute value). Reference symbol 304 indicates an output terminal of the analog comparison circuit 301 that is connected to the P-wells of the backflow preventing circuits 107 and 108.

Figure 4:
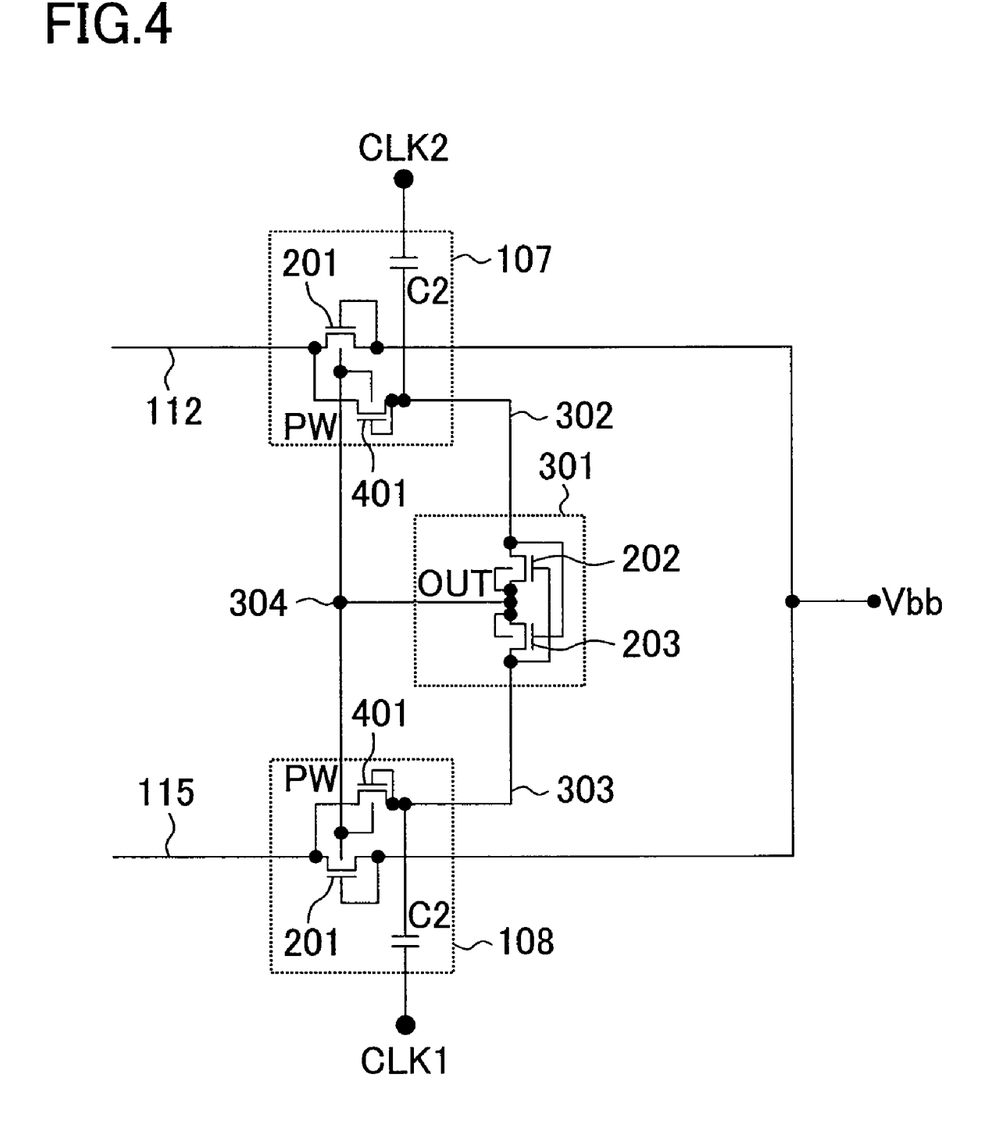
FIG. 4 is a circuit diagram showing another detailed exemplary configuration of the negative booster circuit of the present invention.

FIG. 4 shows an exemplary specific configuration of the backflow preventing circuits 107 and 108 and the analog comparison circuit 301. Reference symbol 401 indicates a diode-connected Nch transistor provided between the input/output terminal 112 (115) and the intermediate terminal 302 (303) of the backflow preventing circuit 107 (108). Reference symbol C2 indicates a booster capacitance that negatively boosts the intermediate terminal 302 (303). Note that the same reference symbols as those of FIGS. 1, 2A and 2B indicate similar parts.

As is different from FIG. 1, in the configuration of FIG. 3, the analog comparison circuit 301 is provided to the backflow preventing circuits 107 and 108 so that the P-wells of the backflow preventing circuits 107 and 108 are fixed to a lower voltage. As a result, the operation of the parasitic bipolar transistor can be suppressed, thereby making it possible to substantially prevent a reduction in boosting efficiency.

Figure 5:
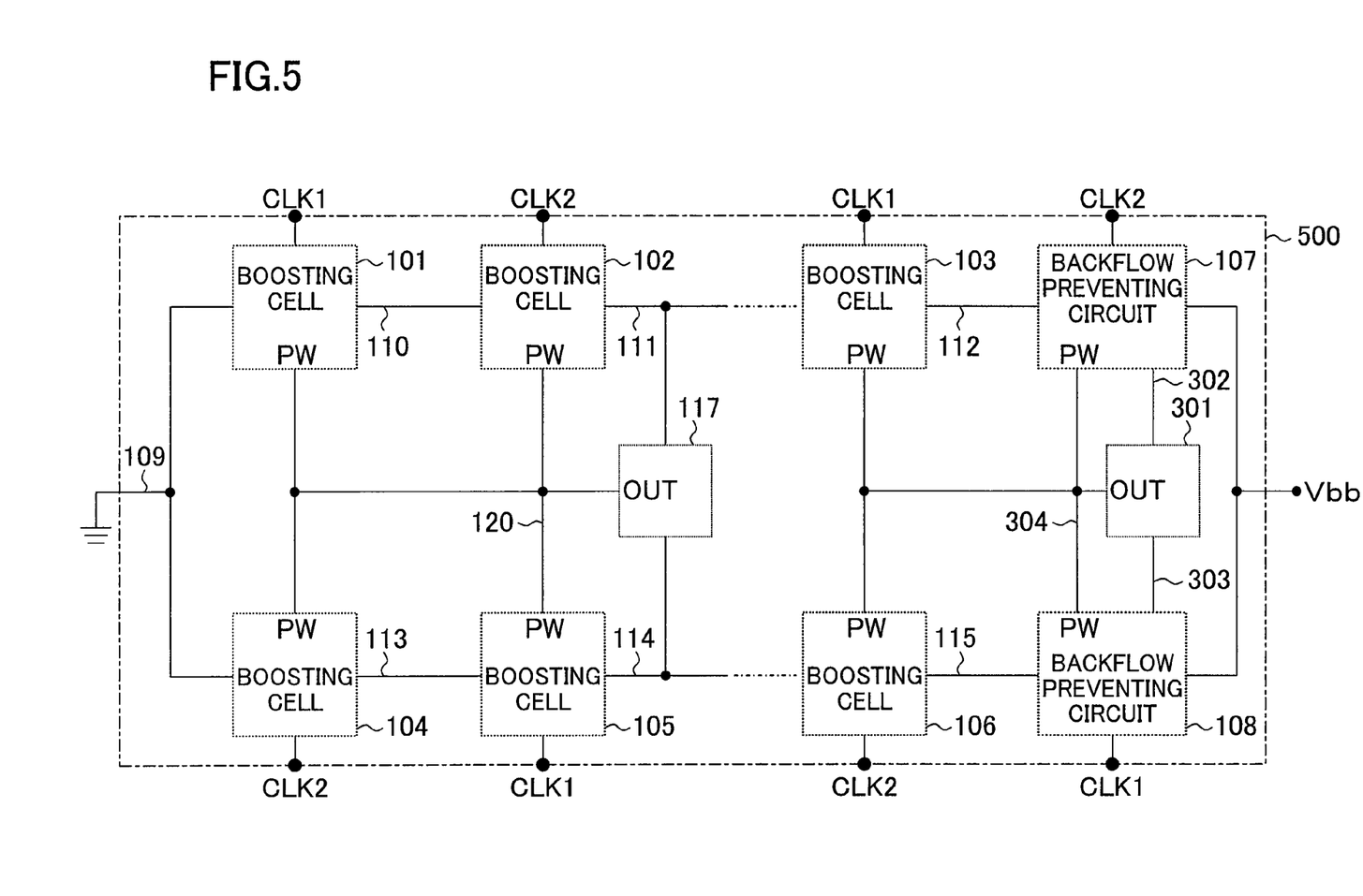
FIG. 5 is a block diagram showing still another exemplary configuration of the negative booster circuit of the present invention.

Note that the analog comparison circuits 116 to 118 can be provided to any number of boosting cell stages as shown in a negative booster circuit 500 of FIG. 5, taking into consideration the margin of the breakdown voltage between the P-well and the N-well and the circuit area. Thus, an effect similar to that of the aforementioned configuration can be obtained, while the number of elements is reduced. Also, if a diode means is provided between the input terminal or the output terminal and the P-well of a boosting cell in a stage that does not include an analog comparison circuit, a forward bias between the P-well and the input/output terminal of the boosting cell can be avoided during activation of the negative booster circuit, so that it can be expected that the operation of the negative booster circuit is caused to be stable. Also, by supplying, to the P-well of a boosting cell in another negative booster circuit and the P-well of a backflow preventing circuit that do not include an analog comparison circuit, the output voltage of an analog comparison circuit in the corresponding stage, an increase in area of the negative booster circuit can be substantially prevented.

Figure 6A:
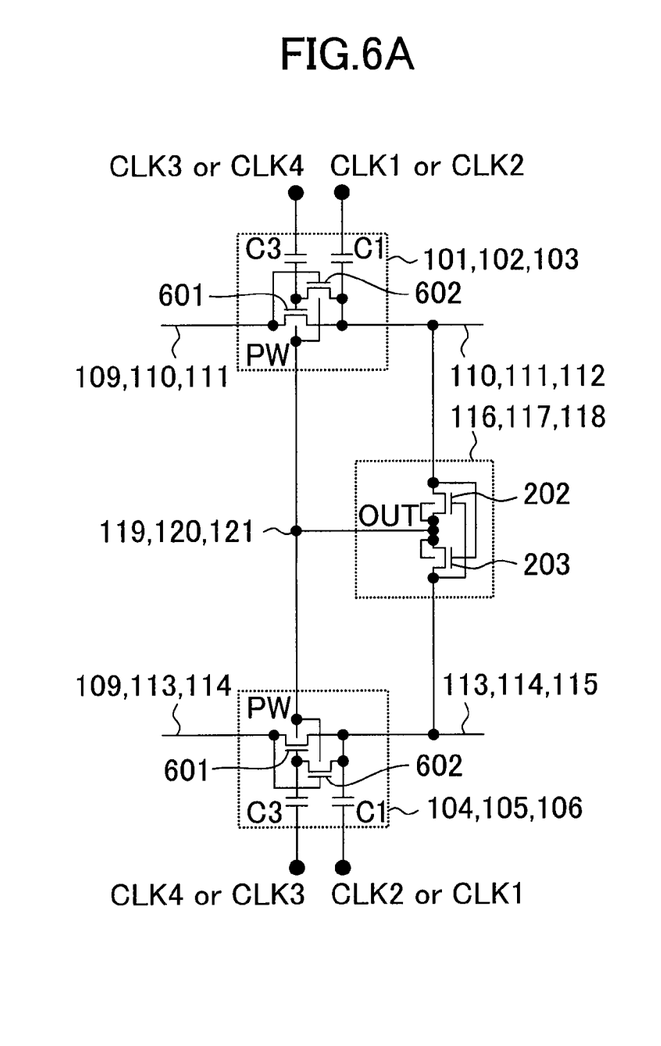
FIGS. 6A and 6B are circuit diagrams showing still another exemplary configuration of the negative booster circuit of the present invention.
Figure 6B:
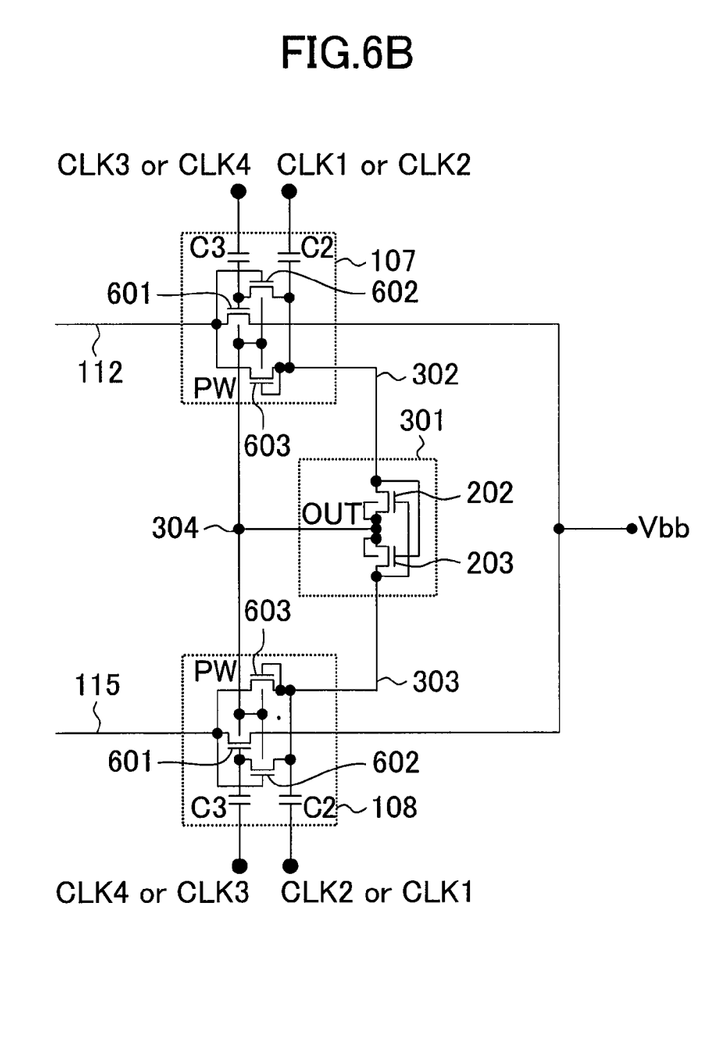
Figure 7A:
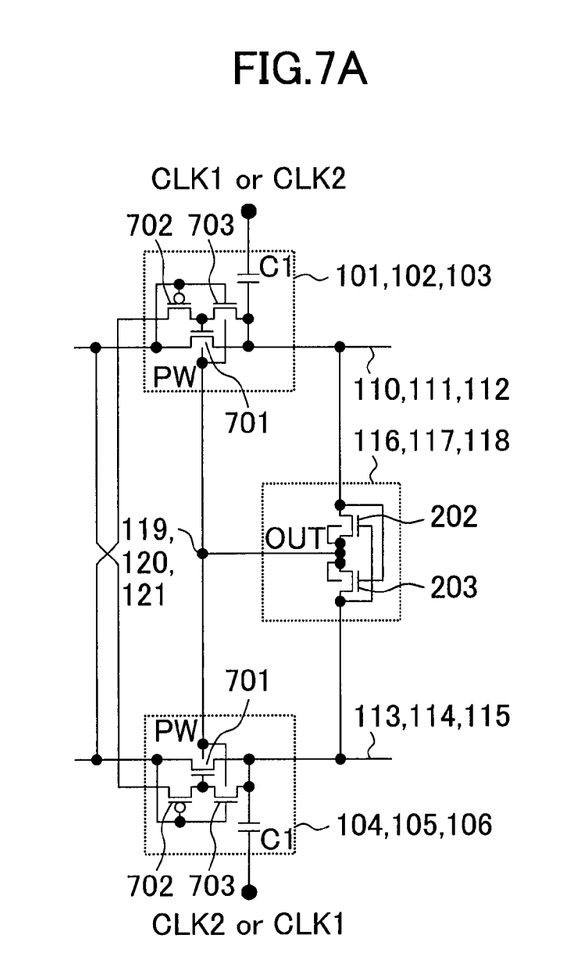
FIGS. 7A and 7B are circuit diagrams showing still another exemplary configuration of the negative booster circuit of the present invention.
Figure 7B:
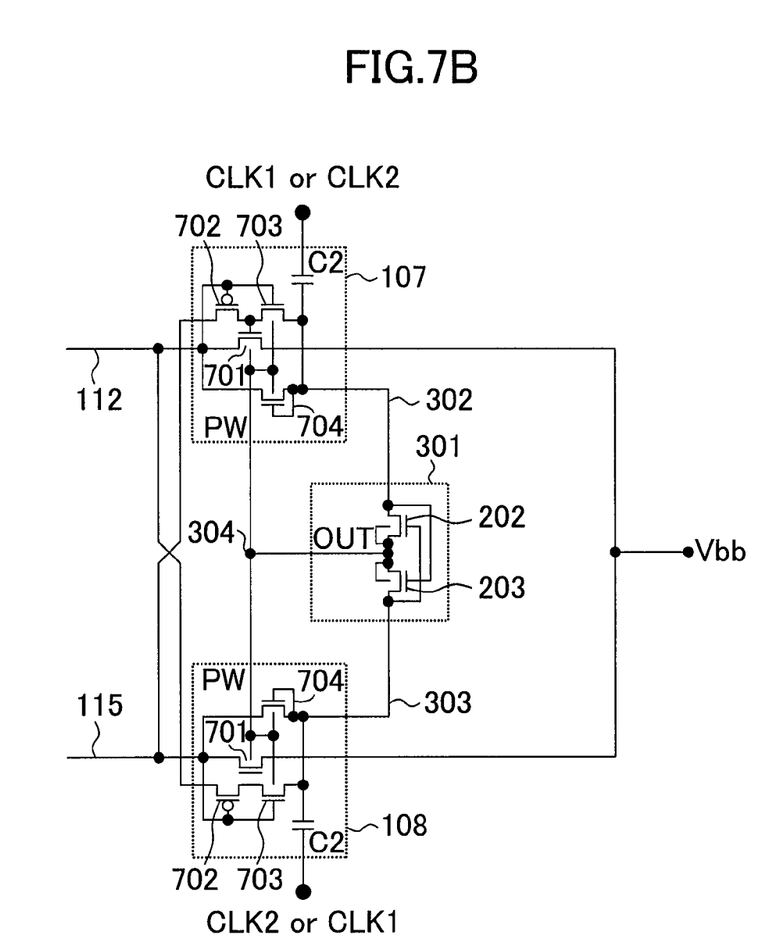

The negative booster circuit employing the two-phase clock signals CLK1 and CLK2 has been described above as an example. A negative booster circuit employing four-phase clock signals CLK1, CLK2, CLK3 and CLK4 as shown in FIGS. 6A and 6B, or a negative booster circuit employing two-phase clock signals CLK1 and CLK2 as shown in FIGS. 7A and 7B, may be used. Insofar as triple-well Nch transistors are employed, a similar effect can be obtained by further employing analog comparison circuits 116 to 118, irrespective of the configurations of the boosting cell and the backflow preventing circuit.

Note that, in FIG. 6A, reference symbol 601 indicates a charge transfer transistor (Nch transistor), reference symbol 602 indicates a sub-charge transfer transistor (Nch transistor), and reference symbol C3 indicates a sub-booster capacitance. Also, in FIG. 6B, reference symbol 603 indicates a diode-connected Nch transistor. In FIG. 7A, reference symbol 701 indicates a charge transfer transistor (Nch transistor), reference symbol 702 indicates a Pch transistor, and reference symbol 703 indicates an Nch transistor. Also, in FIG. 7B, reference symbol 704 indicates a diode-connected Nch transistor.

Also, analog comparison circuits 116 to 118 shown in these figures are only for illustrative purposes. Any circuit that has a similar function may be employed.

Figure 8A:
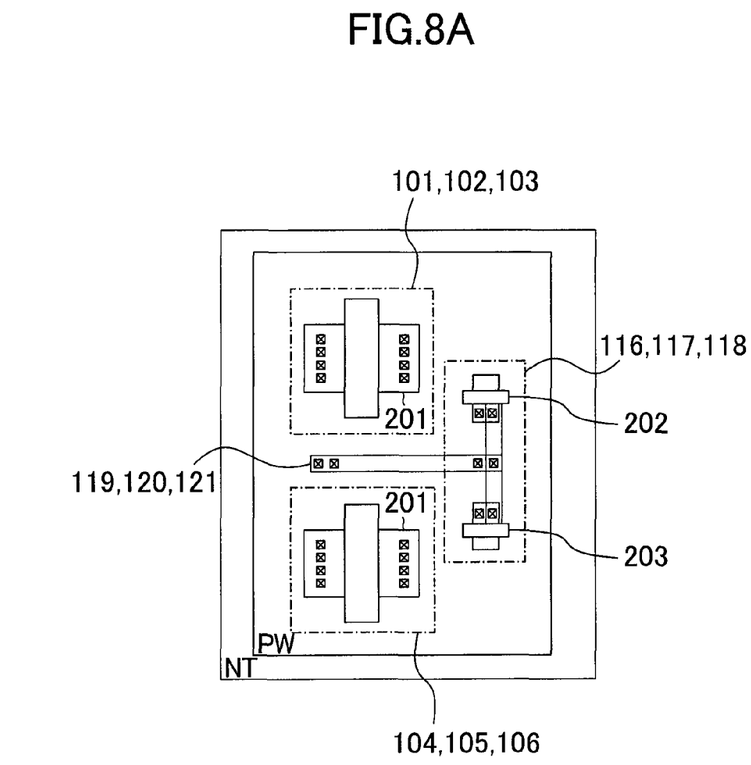
FIGS. 8A and 8B are plan views showing an exemplary layout configuration of the negative booster circuit of the present invention.
Figure 8B:
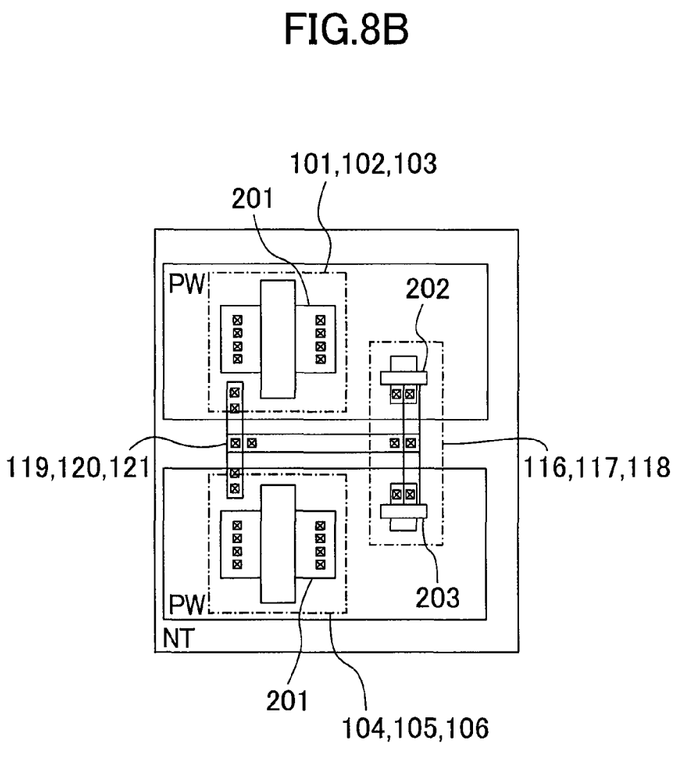

FIGS. 8A and 8B are plan views showing exemplary layout configurations of the negative booster circuit of the present invention. The charge transfer transistors 201 of the boosting cells 101 to 106 and the analog comparison circuits 116 to 118 of FIG. 1 are shown. Note that reference symbol NT indicates a deep N-well on a substrate, and reference symbol PW indicates a P-well formed in the N-well region.

As shown in FIG. 8A, the output terminal 119 (or 120 or 121) of the analog comparison circuit 116 (or 117 or 118) is connected to a common P-well shared by the charge transfer transistors 201 of the boosting cells 101 and 104 (or 102 and 105 or 103 and 106).

According to FIG. 8A, in the switching devices 201 having a triple-well structure provided in the two or more boosting cells 101 and 104 controlled with the output voltage of the analog comparison circuit 116, a common P-well can be arranged, so that the layout area can be reduced.

Figures 9A, 9B:
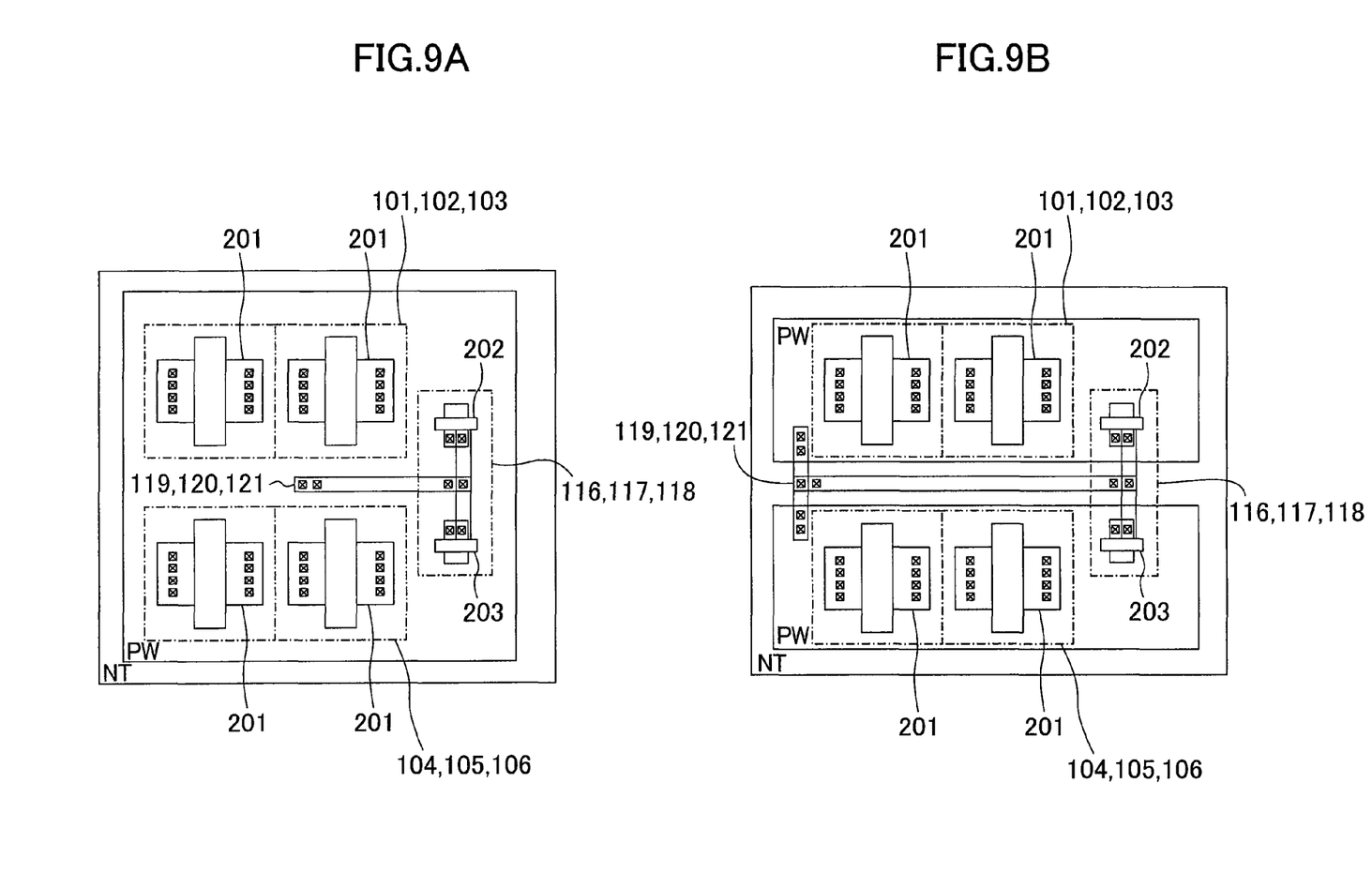
FIGS. 9A and 9B are plan views showing another exemplary layout configuration of the negative booster circuit of the present invention.

Note that the layout configuration of FIG. 8A is only for illustrative purposes. As shown in FIG. 8B, and also in FIGS. 9A and 9B, separate P-wells or a common P-well can be arranged for the switching devices 201 controlled with the output voltage of the analog comparison circuit 116 irrespective of the number of boosting cell stages.

Also, separate P-wells or a common P-well can be arranged for the backflow preventing circuits, as is similar to the boosting cells.

As described above, in the negative booster circuit of the present invention, the substrate biasing effect can be suppressed in the triple-well structure element included in each boosting cell, so that the current consumption, the circuit area and the layout area can be reduced. Therefore, the negative booster circuit of the present invention is useful as a power supply generating circuit or the like for a non-volatile semiconductor memory device and the improvement of analog circuit characteristics in a CMOS process.

Also, the negative booster circuit of the present invention is applicable to power supply circuits for a volatile semiconductor memory device (DRAM, etc.), a liquid crystal device, a mobile device, and the like.

What is claimed is:

1. A booster circuit comprising:
   boosting cells each having a first-conductivity type first well region on a substrate, a second-conductivity type second well region in the first well region, and at least one first switching element in either or both of the first well region and the second well region;
   a first boosting cell row including N stages ($N \geq 1$) of the boosting cells;
   a second boosting cell row including M stages ($M \geq 1$) of the boosting cells; and
   a first analog comparison circuit for outputting one having the larger absolute value of voltages of an output potential of the boosting cell in the i-th stage ($1 \leq i \leq N$) of the first boosting cell row and an output potential of the boosting cell in the i-th stage ($1 \leq i \leq M$) of the second boosting cell row,
   wherein an output potential of the first analog comparison circuit is applied to the second well region of the at least one first switching element included in at least one of the boosting cells in a k-th stage ($1 \leq k \leq i$).

2. The booster circuit of claim 1, further comprising:
   a backflow preventing circuit having a first-conductivity type third well region on the substrate, a second-conductivity type fourth well region in the third well region, and at least one second switching element in either or both of the third well region and the fourth well region,
   wherein the backflow preventing circuit is further provided in the first boosting cell row to form a third boosting cell row,
   the backflow preventing circuit is further provided in the second boosting cell row to form a fourth boosting cell row, and
   the output potential of the first analog comparison circuit provided in the boosting cell in the i-th stage ($1 \leq i \leq N$ and $1 \leq i \leq M$) is applied to the fourth well region of the at least one second switching device provided in at least one of the backflow preventing circuits.

3. The booster circuit of claim 1, further comprising:
   a backflow preventing circuit having a first-conductivity type third well region on the substrate, a second-conductivity type fourth well region in the third well region, and at least one second switching element in either or both of the third well region and the fourth well region,
   a third boosting cell row formed by further providing the backflow preventing circuit in the first boosting cell row;
   a fourth boosting cell row formed by further providing the backflow preventing circuit in the second boosting cell row; and
   a second analog comparison circuit for comparing a first internal node voltage of the backflow preventing circuit provided in the third boosting cell row and a second internal node voltage of the backflow preventing circuit provided in the fourth boosting cell row,
   wherein an output potential of the second analog comparison circuit is applied to the fourth well region of the at least one second switching device provided in at least one of the backflow preventing circuits.

4. The booster circuit of claim 1, wherein the first analog comparison circuit is provided for each of all the boosting cell stages.

5. The booster circuit of claim 1, wherein the first analog comparison circuit is provided every arbitrary number of boosting cells.

6. The booster circuit of claim 1, wherein the first analog comparison circuit has a first-conductivity type fifth well region on the substrate, a second-conductivity type sixth well region in the fifth well region, and at least one third switching device in the sixth well region.

7. The booster circuit of claim 3, wherein the second analog comparison circuit has a first-conductivity type seventh well region on the substrate, a second-conductivity type eighth well region in the seventh well region, and at least one fourth switching device in the eighth well region.

8. The booster circuit of claim 6, wherein the second well region of the at least one first switching device and the sixth well region of the at least one third switching device are a common well region shared by the at least one first switching device and the at least one third switching device.

9. The booster circuit of claim 7, the fourth well region of the at least one second switching device and the eighth well region of the at least one fourth switching device are a common well region shared by the at least one second switching device and the at least one fourth switching device.

10. A booster circuit comprising:

boosting cells each having a first-conductivity type first well region on a substrate, a second-conductivity type second well region in the first well region, and at least one first switching element in either or both of the first well region and the second well region;

a first boosting cell row including N stages (N≧1) of the boosting cells;

a second boosting cell row including M stages (M≧1) of the boosting cells; and a first analog comparison circuit for outputting one having the larger absolute value of voltages of an output potential of the boosting cell in the i-th stage (1≦i≦N) of the first boosting cell row and an output potential of the boosting cell in the i-th stage of the second boosting cell row, wherein the second well region of the boosting cell in the i-th stage (1≦i≦N) of the first boosting cell row and the second well region of the boosting cell in the i-th stage (1≦i≦M) of the second boosting cell row are a common well region shared by the boosting cell in the i-th stage (1≦i≦N) of the first boosting cell row and the boosting cell in the i-th stage (1≦i≦M) of the second boosting cell row.

11. The booster circuit of claim 10, further comprising:

a backflow preventing circuit having a first-conductivity type third well region on the substrate, a second-conductivity type fourth well region in the third well region, and at least one second switching element in either or both of the third well region and the fourth well region, wherein the backflow preventing circuit is further provided in the first boosting cell row to form a third boosting cell row, the backflow preventing circuit is further provided in the second boosting cell row to form a fourth boosting cell row, and the fourth well region of the backflow preventing circuit provided in the third boosting cell row and the fourth well region of the backflow preventing circuit provided in the fourth boosting cell row are a common well region shared by the backflow preventing circuit provided in the third boosting cell row and the backflow preventing circuit provided in the fourth boosting cell row.

12. The booster circuit of claim 6, wherein an output voltage of the first analog comparison circuit is applied to the sixth well region of the first analog comparison circuit.

13. The booster circuit of claim 7, wherein an output voltage of the second analog comparison circuit is applied to the eighth well region of the second analog comparison circuit.

14. The booster circuit of claim 10, wherein an output voltage of the first analog comparison circuit is applied to a third well region of the first analog comparison circuit.

* * * * *